United States Patent
Tu et al.

(10) Patent No.: US 11,927,266 B2
(45) Date of Patent: Mar. 12, 2024

(54) DUAL-SPEED FINAL DRIVE CONTROL METHOD AND TERMINAL DEVICE, AND STORAGE MEDIUM

(71) Applicant: Xiamen Yaxon Network Co., Ltd., Fujian (CN)

(72) Inventors: Yankai Tu, Fujian (CN); Hejie Zhou, Fujian (CN)

(73) Assignee: Xiamen Yaxon Network Co., Ltd., Fujian (CN)

( * ) Notice: Subject to any disclaimer, the term of this patent is extended or adjusted under 35 U.S.C. 154(b) by 0 days.

(21) Appl. No.: 18/005,632

(22) PCT Filed: Aug. 18, 2020

(86) PCT No.: PCT/CN2020/109677
§ 371 (c)(1),
(2) Date: Jan. 16, 2023

(87) PCT Pub. No.: WO2022/011772
PCT Pub. Date: Jan. 20, 2022

(65) Prior Publication Data
US 2023/0272850 A1    Aug. 31, 2023

(30) Foreign Application Priority Data
Jul. 16, 2020   (CN) .......................... 202010683849.9

(51) Int. Cl.
*F16H 59/66*     (2006.01)
*F16H 63/44*     (2006.01)
(Continued)

(52) U.S. Cl.
CPC ............. *F16H 63/44* (2013.01); *F16H 59/66* (2013.01); *F16H 2059/147* (2013.01); *F16H 2059/663* (2013.01); *F16H 2061/009* (2013.01)

(58) Field of Classification Search
CPC .............. F16H 59/66; F16H 2059/663; F16H 2061/0234; F16H 2059/666;
(Continued)

(56) References Cited

U.S. PATENT DOCUMENTS 7,146,264 B2   12/2006 Bates et al.
11,565,699 B1 * 1/2023 Ravella ............. B60W 60/0023
(Continued)

FOREIGN PATENT DOCUMENTS

| CN | 105431659 A | 3/2016 |
|---|---|---|
| CN | 109555847 A | 4/2019 |
| DE | 10008665 A1 | 8/2001 |

OTHER PUBLICATIONS

International Search Report cited in PCT/CN2020/109677 dated Apr. 1, 2021, 6 pages.
(Continued)

*Primary Examiner* — Roger L Pang
(74) *Attorney, Agent, or Firm* — Cooper Legal Group, LLC

(57) ABSTRACT

The disclosure relates to a dual-speed final drive control method and terminal device, and a storage medium. The method includes: when an absolute value of a gradient value of a road ahead is greater than a gradient threshold, determining, according to the gradient value, whether the road ahead is an uphill section or a downhill section, thereby controlling all gears of a transmission to correspond to a higher final drive ratio or a lower final drive ratio in the dual-speed final drive. The disclosure can make use of the dual-speed-ratio final drive to the greatest extent to improve the economy in energy consumption of the entire vehicle.

6 Claims, 2 Drawing Sheets

---

S1: Acquire, according to electronic horizon data ahead, a gradient value of a road ahead, and when an absolute value of the gradient value is greater than a gradient threshold, proceed to S2

S2: Determine, according to the gradient value, whether the road ahead is an uphill section or a downhill section, and if the road ahead is the uphill section, control all gears of a transmission to correspond to a higher final drive ratio in the dual-speed final drive when a vehicle travels into the uphill section; and if the road ahead is the downhill section, control all the gears of the transmission to correspond to a lower final drive ratio in the dual-speed final drive when the vehicle travels into the uphill section

(51) Int. Cl.
*F16H 59/14* (2006.01)
*F16H 61/00* (2006.01)

(58) Field of Classification Search
CPC ....... F16H 2200/0026; F16H 2059/147; F16H 61/70; F16H 63/44; F16H 2061/0223; F16H 2061/009; B60W 2552/15; B60W 2710/1005
USPC .............................................. 701/65; 74/335
See application file for complete search history.

(56) References Cited

U.S. PATENT DOCUMENTS

| | | | |
|---|---|---|---|
| 2009/0093936 A1* | 4/2009 | Lindgren | ............ F16H 61/0213 |
| | | | 701/55 |
| 2009/0205450 A1* | 8/2009 | Gitt | ........................ F16H 37/046 |
| | | | 74/335 |
| 2018/0299008 A1* | 10/2018 | Wippler | .................. F16H 59/60 |
| 2021/0245761 A1* | 8/2021 | Steinborn | ............. B60W 10/04 |

OTHER PUBLICATIONS

Written Opinion cited in PCT/CN2020/109677 dated Apr. 1, 2021, 3 pages.

* cited by examiner

| Gear | Speed ratio of gear of transmission | Final drive ratio |
|---|---|---|
| 1 | 3.357 | 3.944 |
| 2 | 2.087 | |
| 3 | 1.469 | |
| 4 | 1.15 | |
| 5 | 1.194 | 3.087 |
| 6 | 0.975 | |

FIG. 1

DUAL-SPEED FINAL DRIVE CONTROL METHOD AND TERMINAL DEVICE, AND STORAGE MEDIUM

TECHNICAL FIELD

The present invention relates to the field of vehicle control, and in particular to a dual-speed final drive control method and terminal device, and a storage medium.

BACKGROUND

An automotive final drive typically has a fixed drive ratio, but the driveline of some vehicles uses a dual-speed final drive for the transmission. The dual-speed final drive can reduce the size of the transmission and facilitate arrangement on the premise of satisfying the power performance and economy of the vehicle. However, the traditional dual-speed final drive is generally fixedly matched with gears of the transmission. FIG. 1 shows a matching relationship between a 6-speed transmission and a dual-speed final drive of a model. One final drive ratio corresponds the first four gears, and the other final drive ratio corresponds to the last two gears. The final drive with dual speed ratios can use a lower speed ratio at a higher gear to improve the vehicle economy, and use a higher speed ratio at a lower gear to ensure the power performance of the vehicle when going uphill or under load.

However, when the vehicle is running, the conditions and terrain are constantly changing. This fixed relationship cannot ensure the vehicle to be suitable for every specific running environment.

SUMMARY

In order to solve the above problems, the present invention provides a dual-speed final drive control method and terminal device, and a storage medium.

The specific solutions are as follows:

Provided is a dual-speed final drive control method, including the following steps:

S1: acquiring, according to electronic horizon data ahead, a gradient value of a road ahead, and when an absolute value of the gradient value is greater than a gradient threshold, proceeding to S2; and S2: determining, according to the gradient value, whether the road ahead is an uphill section or a downhill section, and if the road ahead is the uphill section, controlling all gears of a transmission to correspond to a higher final drive ratio in the dual-speed final drive when a vehicle travels into the uphill section; and if the road ahead is the downhill section, controlling all the gears of the transmission to correspond to a lower final drive ratio in the dual-speed final drive when the vehicle travels into the uphill section.

Further, the gradient threshold is a gradient value of the downhill section when a gravity generated by the gradient just makes up for a decrease in a driving force caused by making all the gears of the transmission correspond to a gear corresponding to the lower final drive ratio in the dual-speed final drive.

Further, the decrease in the driving force caused by making all the gears of the transmission correspond to the gear corresponding to the lower final drive ratio in the dual-speed final drive is:

$$\Delta F = \frac{\eta T i_k}{r}(i_{m1} - i_{m2})$$

where $\Delta F$ represents the decrease in the driving force, T represents an output torque of a vehicle engine, $i_k$ represents a current gear, $i_{m1}$ represents a gear corresponding to a higher one of the two final drive ratios, $i_{m2}$ represents the gear corresponding to the lower one of the two final drive ratios, r represents a radius of a vehicle wheel, and η represents a gear efficiency of the vehicle.

Further, a calculation formula of the gradient threshold is:

$$\theta' = \arcsin\left[\frac{\eta T i_k}{rmg}(i_{m1} - i_{m2})\right]$$

where $\theta'$ represents the gradient threshold, m represents a mass of the vehicle, and g represents gravity acceleration.

Provided is a dual-speed final drive control terminal device, including a processor, a memory, and a computer program stored in the memory and running in the processor. The processor, when executing the computer program, implements the steps in the method in the embodiments of the present invention.

Provided is a computer-readable storage medium having a computer program stored thereon. The computer program, when executed by a processor, implements the steps in the method in the embodiments of the present invention.

According to the technical solutions of the present invention, information of the road gradient predicted by the electronic horizon is used in control of dynamic matching between the speed ratio of the dual-speed final drive and the speed ratio of the transmission, thereby making use of the dual-speed-ratio final drive to the greatest extent according to the terrain to improve the economy in energy consumption of the entire vehicle.

BRIEF DESCRIPTION OF DRAWINGS

FIG. 1 shows a matching relationship between a 6-speed transmission and a dual-speed final drive.

DESCRIPTION OF EMBODIMENTS

Figure 2:
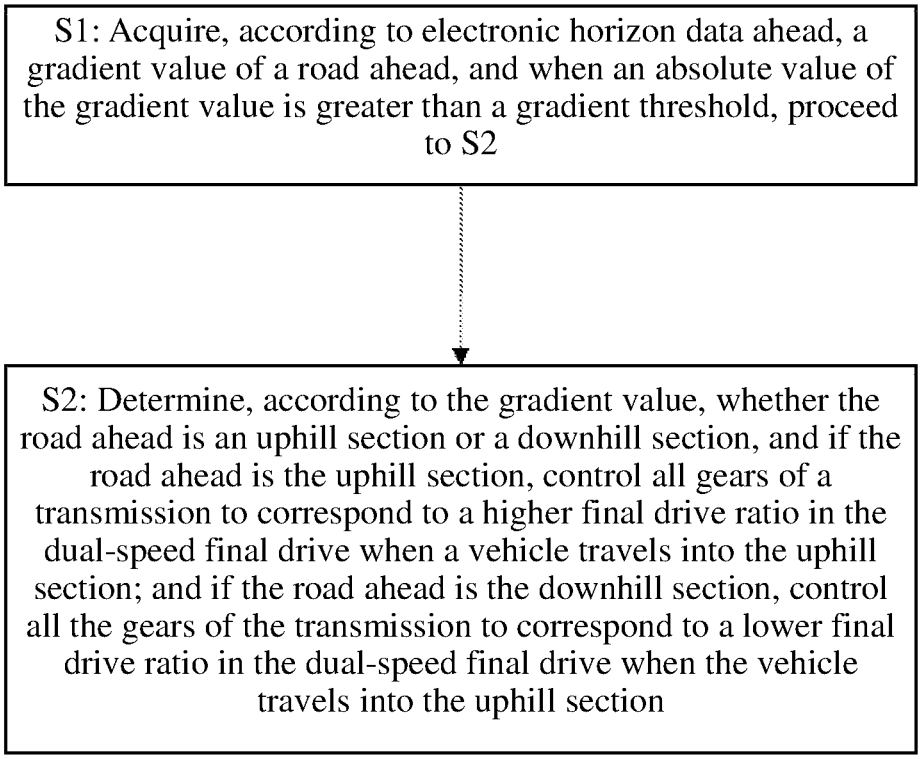
FIG. 2 shows a flowchart of Embodiment I of the present invention.

To further illustrate the embodiments, the accompanying drawings are provided in the present invention. These accompanying drawings are a part of the contents disclosed in the present invention that are mainly used to illustrate the embodiments, and can be used in conjunction with the related descriptions in the specification to explain the operation principle of the embodiments. With reference to these contents, those skilled in the art will be able to understand other possible implementations and advantages of the present invention.

The present invention will be further described in conjunction with the accompanying drawings and the specific implementations.

Embodiment I

This embodiment of the present invention provides a dual-speed final drive control method. As shown in FIG. 2, the method includes the following steps:

S1: Acquire, according to electronic horizon data ahead, a gradient value of a road ahead, and when an absolute value of the gradient value is greater than a gradient threshold, proceed to S2.

S2: Determine, according to the gradient value, whether the road ahead is an uphill section or a downhill section, and if the road ahead is the uphill section, control all gears of a transmission to correspond to a higher final drive ratio in the dual-speed final drive when a vehicle travels into the uphill section; and if the road ahead is the downhill section, control all the gears of the transmission to correspond to a lower final drive ratio in the dual-speed final drive when the vehicle travels into the uphill section.

The higher final drive ratio is used for the uphill section to increase the speed ratio corresponding to the high gear of the transmission and improve the power performance of the vehicle, which can reduce the fuel consumption caused by shifting to a lower gear of the transmission in the case of lacking sufficient power, and also ensure the economy of the vehicle.

The lower final drive ratio is used for the downhill section, which can improve the economy of the vehicle. After the vehicle travels into the downhill section, the gravity generated by the gradient of the downhill section can make up for the power loss caused by the use of the lower drive ratio, so that the drivability is not affected.

When the absolute value of the gradient value is less than or equal to the gradient threshold, the original corresponding relationship between the gear of the transmission and the speed ratio in the two final drive ratios is maintained, so as to maintain the economy of the original traditional parameters of the vehicle under common conditions.

A method of calculating the gradient threshold will be introduced below.

When the vehicle travels with the higher one of the two final drive ratios, the mechanical drive equation of the vehicle is:

$$F_1 = \frac{\eta T i_k i_{m1}}{r}$$

When the vehicle travels with the lower one of the two final drive ratios, the mechanical drive equation of the vehicle is:

$$F_2 = \frac{\eta T i_k i_{m2}}{r}$$

where $F_1$ and $F_2$ respectively represent a driving force of the vehicle, T represents an output torque of a vehicle engine, $i_k$ represents a current gear, $i_{m1}$ represents a gear corresponding to the higher one of the two final drive ratios, $i_{m2}$ represents the gear corresponding to the lower one of the two final drive ratios, r represents a radius of a vehicle wheel, and η represents a gear efficiency of the vehicle, which is typically a fixed value.

When the gear $i_{m2}$ corresponding to the lower one of the two final drive ratios is used to replace the gear $i_{m1}$ corresponding to the higher one of the two final drive ratios, since $i_{m2} < i_{m1}$, the driving force of the vehicle will be affected, causing the decrease in the driving force of the vehicle:

$$\Delta F = F_1 - F_2 = \frac{\eta T i_k}{r}(i_{m1} - i_{m2})$$

ΔF represents the decrease in the driving force.

When the vehicle travels into the downhill section, the gravity generated by the gradient can make up for the decrease in the driving force caused by making all the gears of the transmission correspond to the gear $i_{m2}$ corresponding to the lower final drive ratio in the dual-speed final drive. Assuming that the gradient value is θ, when the gravity generated by the gradient just makes up for the decrease in power, the relationship is:

$$mg \sin\theta = \Delta F = \frac{\eta T i_k}{r}(i_{m1} - i_{m2})$$

where m represents the mass of the vehicle, and g represents gravity acceleration.

Therefore, the gradient value θ' when the gravity generated by the gradient just makes up for the decrease in power is:

$$\theta' = \arcsin\left[\frac{\eta T i_k}{rmg}(i_{m1} - i_{m2})\right]$$

Since $i_{m2} < i_{m1}$, the sign of θ' is positive. The method of calculating the gradient value when the gravity generated by the gradient of the uphill section just makes up for the decrease in power is the same as that when the gravity generated by the gradient of the downhill section just makes up for the decrease in power. The calculated value for the uphill section has the same absolute value as that for the downhill section, but with an opposite sign. Therefore, the gradient value is set as θ'.

In Embodiment of the present invention, based on the electronic horizon technology, accurate information of the road ahead can be provided for the vehicle according to map data and satellite positioning signals, so that the vehicle has the ability of predicting the road condition in a quite long distance ahead. The information of the road gradient predicted by the electronic horizon is used in control of dynamic matching between the speed ratio of the dual-speed final drive and the speed ratio of the transmission, thereby making use of the dual-speed-ratio final drive to the greatest extent according to the terrain to improve the economy in energy consumption of the entire vehicle.

Embodiment II

The present invention further provides a dual-speed final drive control terminal device, including a memory, a processor, and a computer program stored in the memory and capable of running in the processor. The processor, when executing the computer program, implements the steps in the method embodiment in Embodiment I of the present invention.

Further, as a feasible implementation, the dual-speed final drive control terminal device may be an on-board computer, a cloud server or other computing devices. The dual-speed final drive control terminal device may include, but not limited to, a processor and a memory. It can be understood by those skilled in the art that the composition of the dual-speed final drive control terminal device is merely an example of the dual-speed final drive control terminal device, and does not constitute a limitation to the dual-speed final drive control terminal device. The dual-speed final drive control terminal device may include more or less components than the above, or a combination of some components, or different components. For example, the dual-speed final drive control terminal device may further include input-output devices, network access devices, buses, etc., which is not limited by the embodiment of the present invention.

Further, as a feasible implementation, the processor may be a central processing unit (CPU), other general-purpose processors, a digital signal processor (DSP), an application specific integrated circuit (ASIC), a field-programmable gate array (FPGA) or other programmable logic devices, a discrete gate or transistor logic device, a discrete hardware component, etc. The general-purpose processor may be a microprocessor, or the processor may also be any conventional processor, etc. The processor is the control center of the dual-speed final drive control terminal device, and connects all parts of the entire dual-speed final drive control terminal device using various interfaces and lines.

The memory can be used for storing the computer program and/or module. The processor implements various functions of the dual-speed final drive control terminal device by running or executing the computer program and/or module stored in the memory and calling the data stored in the memory. The memory may mainly include a program storage area and a data storage area. The program storage area may store an operating system and application programs required by at least one function. The data storage area may store data created according to the use of a mobile phone, etc. Besides, the memory may include a high-speed random access memory, and may further include a non-volatile memory, such as a hard disk, an internal memory, a plug-in hard disk, a smart media card (SMC), a secure digital (SD) card, a flash card, at least one disk memory device, a flash memory device, or other volatile solid-state memory devices.

The present invention further provides a computer-readable storage medium having a computer program stored thereon. The computer program, when executed by a processor, implements the steps in the method in the embodiments of the present invention.

If an integrated module/unit of the dual-speed final drive control terminal device is implemented in the form of a software functional unit and sold or used as an independent product, it can be stored in the computer-readable storage medium. Based on such understanding, the implementation of all or part of the processes in the method of the embodiments of the present invention may also be completed by instructing related hardware by the computer program. The computer program may be stored in a computer-readable storage medium. The computer program, when executed by the processor, can implement the steps in the method embodiments. The computer program includes a computer program code, which may be in the form of a source code, an object code or an executable file, or in some intermediate forms. The computer-readable medium may include: any entity or apparatus capable of carrying the computer program code, a recording medium, a USB flash drive, a removable hard drive, a magnetic disk, an optical disk, a computer memory, a read-only memory (ROM), a random access memory (RAM), a software distribution medium, etc.

Although the present invention has been specifically shown and described in connection with the preferred implementations, it should be understood by those skilled in the art that various changes in form and details can be made without departing from the spirit and scope of the present invention as defined by the appended claims, and shall all fall within the protection scope of the present invention.

The invention claimed is:

1. A dual-speed final drive control method, wherein during a normal operation, a limited number gears of a transmission correspond to a higher final drive ratio and a lower final drive ratio, respectively, of a dual-speed final drive; and comprising the following steps: S1: acquiring, according to electronic horizon data ahead, a gradient value of a road ahead, and when an absolute value of the gradient value is greater than a gradient threshold, proceeding to S2; and S2: determining, according to the gradient value, whether the road ahead is an uphill section or a downhill section, and when the road ahead is the uphill section, controlling all gears of the transmission to correspond to the higher final drive ratio in the dual-speed final drive when a vehicle travels into the uphill section; and when the road ahead is the downhill section, controlling all the gears of the transmission to correspond to the lower final drive ratio in the dual-speed final drive when the vehicle travels into the downhill section.

2. The dual-speed final drive control method according to claim 1, wherein the gradient threshold is a gradient value of the downhill section when a gravity generated by a gradient just makes up for a decrease in a driving force caused by making all the gears of the transmission correspond to a gear corresponding to the lower final drive ratio in the dual-speed final drive.

3. The dual-speed final drive control method according to claim 2, wherein the decrease in the driving force caused by making all the gears of the transmission correspond to the gear corresponding to the lower final drive ratio in the dual-speed final drive is:

$$\Delta F = \frac{\eta T i_k}{r}(i_{m1} - i_{m2})$$

wherein $\Delta F$ represents the decrease in the driving force, T represents an output torque of a vehicle engine, $i_k$ represents a current gear, $i_{m1}$ represents a gear corresponding to the higher final drive ratio, $i_{m2}$ represents a gear corresponding to the lower final drive ratio, r represents a radius of a vehicle wheel, and $\eta$ represents a gear efficiency of the vehicle.

4. The dual-speed final drive control method according to claim 3, wherein a calculation formula of the gradient threshold is:

$$\theta' = \arcsin\left[\frac{\eta T i_k}{rmg}(i_{m1} - i_{m2})\right]$$

wherein $\theta'$ represents the gradient threshold, m represents a mass of the vehicle, and g represents gravity acceleration.

5. A dual-speed final drive control terminal device, comprising a processor, a memory, and a computer program stored in the memory and running in the processor, wherein the processor, when executing the computer program, implements the steps in the method according to claim 1.

6. A non-transitory computer-readable storage medium having a computer program stored thereon, wherein the computer program, when executed by a processor, implements the steps in the method according to claim 1.

\* \* \* \* \*